United States Patent
Nayak et al.

(10) Patent No.: US 9,866,424 B2
(45) Date of Patent: Jan. 9, 2018

(54) BUSINESS SERVICES DASHBOARD

(71) Applicant: CenturyLink Intellectual Property LLC, Denver, CO (US)

(72) Inventors: Naresh Nayak, Bangalore (IN);
Gowrish Bhaskar, Bangalore (IN);
Viswanath Seetharam, Bangalore (IN)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 15/628,441

(22) Filed: Jun. 20, 2017

(65) Prior Publication Data

US 2017/0286881 A1 Oct. 5, 2017

Related U.S. Application Data

(63) Continuation of application No. 13/913,813, filed on Jun. 10, 2013, now Pat. No. 9,697,489.
(Continued)

(51) Int. Cl.
*H04L 12/24* (2006.01)
*G06Q 10/10* (2012.01)
(Continued)

(52) U.S. Cl.
CPC ...... *H04L 41/0213* (2013.01); *G06F 11/3447* (2013.01); *G06Q 10/0639* (2013.01); *G06Q 10/10* (2013.01)

(58) Field of Classification Search
None
See application file for complete search history.

(56) References Cited

U.S. PATENT DOCUMENTS 7,921,024 B2 * 4/2011 Hogan ............... G06Q 10/06
705/7.22
8,200,527 B1 * 6/2012 Thompson ......... G06Q 10/0639
705/7.38
(Continued)

OTHER PUBLICATIONS

Access Insight | Access France. Database [Online]. Available Web Site: www.theaccessgroup.fr/en/solutions/access-insight.aspx. Accessed on Sep. 9, 2013. 4 pages.
(Continued)

*Primary Examiner* — Gurkanwaljit Singh
(74) *Attorney, Agent, or Firm* — Swanson & Bratschun, L.L.C.

(57) ABSTRACT

Novel tools and techniques are provided for implementing a business services dashboard. In some embodiments, a method might comprise defining relationship(s) between at least one technology service and at least one business service provided by an enterprise, and receiving data associated with real-time technical events corresponding to changed conditions in one or more technology services utilizing at least one technology asset. Each defined relationship might indicate a dependence on the one or more technology services by one or more business services. The method might further comprise identifying, based on the defined relationship(s), one or more business events that impact the one or more business services of the enterprise, as a result of the changed condition. Business user views and technical user views might be generated and sent to user devices associated with respective business and technical group users. Corresponding system and apparatus may be provided.

25 Claims, 9 Drawing Sheets

Related U.S. Application Data

(60) Provisional application No. 61/813,998, filed on Apr. 19, 2013.

(51) Int. Cl.
*G06Q 10/06* (2012.01)
*G06F 11/34* (2006.01)

(56) References Cited

U.S. PATENT DOCUMENTS

| | | | | |
|---|---|---|---|---|
| 8,996,397 | B2* | 3/2015 | Grace | G06Q 10/063114 |
| | | | | 705/7.28 |
| 9,697,489 | B2 | 7/2017 | Nayak et al. | |
| 2005/0114829 | A1* | 5/2005 | Robin | G06Q 10/06 |
| | | | | 717/101 |
| 2005/0120112 | A1* | 6/2005 | Wing | G06Q 10/06 |
| | | | | 709/224 |
| 2006/0123022 | A1* | 6/2006 | Bird | G06F 17/30601 |
| 2007/0168874 | A1* | 7/2007 | Kloeffer | G06F 8/65 |
| | | | | 715/764 |
| 2007/0233681 | A1* | 10/2007 | Ronen | G06F 8/71 |
| 2007/0234291 | A1* | 10/2007 | Ronen | G06F 8/36 |
| | | | | 717/120 |
| 2007/0250405 | A1* | 10/2007 | Ronen | G06F 8/36 |
| | | | | 705/26.1 |
| 2008/0034060 | A1* | 2/2008 | Fisher, Jr. | G06F 9/4446 |
| | | | | 709/218 |
| 2008/0082569 | A1* | 4/2008 | Mansour | G06Q 10/10 |
| 2008/0126163 | A1* | 5/2008 | Hogan | G06Q 10/06 |
| | | | | 705/7.25 |
| 2008/0183532 | A1* | 7/2008 | Barnard | G06Q 10/063 |
| | | | | 705/7.14 |
| 2008/0249825 | A1* | 10/2008 | Kunjur | G06Q 10/0637 |
| | | | | 705/7.36 |
| 2009/0171704 | A1* | 7/2009 | Bobak | G06Q 10/06 |
| | | | | 705/7.12 |
| 2011/0145657 | A1* | 6/2011 | Bishop | G06F 11/3495 |
| | | | | 714/47.1 |
| 2012/0089562 | A1* | 4/2012 | Deremigio | G06F 17/30563 |
| | | | | 707/602 |
| 2014/0316845 | A1 | 10/2014 | Nayak et al. | |

OTHER PUBLICATIONS

Business Intelligence Dashboard Software/iDashboards. Available Web Site: http://www.idashboards.com, accessed on Sep. 9, 2013, 1 page.

Enterprise Edition Features/iDashboards. Available Web Site: http://www.idashboards.com/Products/iDashboards-Enterprise-Edition/Enterprise-Features.aspx, accessed on Sep. 9, 2013, 2 pages.

IBM Business Intelligence—Dashboards. Database [Online]. Available Web Site: www-01.ibm.com/software/analytics/rte/an/dashboards/ Last updated: 2013. Accessed on Sep. 9, 2013. 2 pages.

IBM Software Solution Brief. IBM Corporation. Copyright 2010. 4 pages.

Mobile Business Intelligence Tools for Businesses. Roambi. Available Web Site: http://www.roambi.com/business, accesses on Sep. 9, 2013. 5 pages.

SAS BI Dashboard. Database [Online]. Available Web Site: support.sas.com/software/products/bidashboard/index.html Last updated 2013. Accessed on: Sep. 9, 2013. 1 page.

SAS Enterprise BI Server Fact Sheet; SAS Institute Inc. Copyright 2012; 8 pages.

U.S. Appl. No. 13/913,813; Non-Final Rejection dated Aug. 12, 2016; 38 pages.

U.S. Appl. No. 13/913,813; Notice of Allowance dated 2/27/0217; 21 pages.

* cited by examiner

BUSINESS SERVICES DASHBOARD

CROSS-REFERENCES TO RELATED APPLICATIONS

This application is a continuation application of U.S. patent application Ser. No. 13/913,813 (the "'813 application"), filed Jun. 10, 2013 by Naresh Nayak et al., entitled, "Business Services Dashboard," which claims priority to U.S. Patent Application Ser. No. 61/813,998 (the "'998 application"), filed Apr. 19, 2013 by Naresh Nayak et al., entitled, "Business Services Dashboard," the entire teachings of which are incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a method, system, and apparatus for implementing a business services dashboard.

BACKGROUND

Information Technologies ("IT") and businesses are becoming increasingly interdependent. Today, most business services and functionalities are delivered and supported by IT. The alignment of IT with the business requires close association and communication within IT and business. Telecommunications business services are provided by single or multiple applications and sometimes by partnering with other external telecommunications service providers and carriers. Representing a business service's dependency and availability to a variety of business users has always been a huge challenge for telecommunications service providers. Success in any business is gauged by a successful model between IT and business. Currently available models, however, do not provide views of business processes to relevant business or IT stake holders. Such models also do not currently afford ease of use or provide timely vital information for business users, and thus are not able to offer help to IT group members in implementing strategic and tactical business decisions.

For example, leading market business dashboards like IBM BI Dashboard, SAS BI Dashboard, PRELYTIS, and Roambi Dashboard do not put all the pieces together for representing services availability in real-time for telecommunications (or other types of) businesses. These convention business dashboards have the following shortcomings: (1) Businesses need, but do not have, transparency and real-time status of the service availability, unavailability, and slow response time; (2) Business teams are not notified timely when an outage occurs or when an outage is resolved; (3) Business group views or user specific views are not available; (4) Prediction of the next up-time or service availability is lacking; (5) Estimated times for resolution of outages is not available to business teams; (6) Workarounds for business continuity are not available; (7) Business teams are not aware of the outage details like root cause, estimated turnaround times, and the like; (8) Business teams are unable to connect with IT support personnel and other key stakeholders to get more details; (9) Impacted applications or impacted business services due to the outage are not known; and (10) Business teams are unable to collaborate with IT teams for getting more details.

The embodiments disclosed herein are directed toward overcoming one or more of the problems discussed above.

BRIEF SUMMARY

Various embodiments provide techniques for implementing a business services dashboard ("BSD"). According to various embodiments, a BSD might present real-time states of business-critical services and might relate the real-time states of the business-critical services to the health of the underlying infrastructure and applications of the enterprise. A BSD might provide essential contact details, as well as actionable information for sustaining service, or the like. A BSD might also deliver role-based views to every level of the business, across all layers of the IT environment. Users across the organization (whether in a business group or a technology group) can view the type and level of information that corresponds to their business roles.

A BSD, in various embodiments, might also represent a complete end-to-end view of business services, their interdependencies, and their availability, and might provide a business continuity plan to the business. This tool may simplify problem isolation and may improve business service availability. It might also measure and track adherence to the service level agreements ("SLAs") or service level commitments, and might facilitate meeting business objectives by providing high-level real-time views of a company's various business services.

The tools provided by various embodiments include, without limitation, methods, systems, and/or software products. Merely by way of example, a method might comprise one or more procedures, any or all of which might be executed by a computer system. Correspondingly, an embodiment might provide a computer system configured with instructions to perform one or more procedures in accordance with methods provided by various other embodiments. Similarly, a computer program might comprise a set of instructions that are executable by a computer system, or by a processor located in the computer system, to perform such operations. In many cases, such software programs are encoded on physical, tangible, and/or non-transitory computer readable media. Such computer readable media might include, to name but a few examples, optical media, magnetic media, and the like.

In an aspect, a method may be provided for implementing a business services dashboard. The method might comprise defining, with a computer, one or more relationships between at least one information technology ("IT") service and at least one business service provided by an enterprise. Each defined relationship might indicate a dependence on one or more of the at least one IT service by one or more of the at least one business service. The method might further comprise receiving, with the computer, data associated with one or more real-time IT events corresponding to a changed condition in one or more of the at least one IT service. In some cases, the at least one IT service might comprise at least one service utilizing at least one of one or more software applications, one or more servers, one or more databases, or one or more networks. The method might comprise identifying, with the computer and based on the one or more defined relationships between the at least one IT service and the at least one business service, one or more business events that impact the at least one business service of the enterprise as a result of the one or more real-time IT events corresponding to the changed condition in the at least one IT service.

The method might further comprise identifying, with the computer, one or more technical issues associated with the changed condition in the at least one IT service, based at least in part on the data associated with the one or more real-time IT events, identifying, with the computer, a severity level for each of the one or more technical issues, and identifying, with the computer, one or more proposed technical solutions to the one or more technical issues. In some embodiments, the method might further comprise assigning, with the computer, user groups comprising at least one business group and at least one technical group, based on roles of the at least one business group and the at least one technical group in a business process of the enterprise, and generating, with the computer, a plurality of views comprising at least one business user view and at least one technical user view. The at least one business user view might be generated based on a first configuration associated with the at least one business group. The at least one business user view might include identification of the one or more business events. The at least one technical user view might be generated based on a second configuration associated with the at least one technical group. The at least one technical user view might include identification of the one or more technical issues, identification of the severity level for each of the one or more technical issues, and identification of the one or more proposed technical solutions.

The method might comprise sending, with the computer, the at least one business user view to a first set of user devices associated with one or more first members of the at least one business group for display on the first set of user devices, and sending, with the computer, the at least one technical user view to a second set of user devices associated with one or more second members of the at least one technical group for display on the second set of user devices. The method might also comprise updating, with the computer, the at least one business user view with a first update corresponding to updates to the identification of the one or more business events, and sending, with the computer, the first update to the first set of user devices associated with the one or more first members of the at least one business group for display on the first set of user devices. The method might further comprise updating, with the computer, the at least one technical user view with a second update corresponding to updates to at least one of the identification of the one or more technical issues, the identification of the severity level for each of the one or more technical issues, and the identification of the one or more proposed technical solutions, and sending, with the computer, the second update to the second set of user devices associated with the one or more second members of the at least one technical group for display on the second set of user devices. In some cases, the method might comprise providing one or more business continuity solutions to the user groups, the one or more business continuity solutions being associated with the one or more proposed technical solutions and at least partially addressing at least one of the one or more business events.

In another aspect, a method might be provided for implementing a business services dashboard. The method might comprise defining, with a computer, one or more relationships between at least one technology service and at least one business service provided by an enterprise, and receiving, with the computer, data associated with one or more real-time technical events corresponding to a changed condition in one or more of the at least one technology service utilizing at least one technology asset. Each defined relationship might indicate a dependence on one or more of the at least one technology service by one or more of the at least one business service. The method might further comprise identifying, with the computer and based on the one or more defined relationships between the at least one technology service and the at least one business service, one or more business events that impact the at least one business service of the enterprise, as a result of the one or more real-time technical events that correspond to the changed condition in the at least one technology asset. The method might additionally comprise generating, with the computer, at least one business user view including identification of the one or more business events, and sending, with the computer, the at least one business user view to a first set of user devices associated with one or more first users, over a telecommunications network, for display on the first set of user devices.

In some cases, defining the one or more relationships between the at least one technology service and the at least one business service comprises defining the one or more relationships between the at least one technology service and the at least one business service using unified modeling language ("UML"). The method, according to some embodiments, might further comprise providing, with the computer, first options for each of the one or more first users to define or customize notification mechanisms and user interface ("UI") views of the at least one business user view sent to the subject first user, and providing, with the computer, second options for each of the one or more second users to define or customize notification mechanisms and UI views of the at least one technical user view sent to the subject second user.

In some instances, the at least one business user view might further include one or more of identification of a measure of any service outages resulting from the changed condition in the at least one technology asset, identification of relevant service level agreements ("SLAs") associated with the at least one technology asset or the services provided by the enterprise, summary of availability of the services provided by the enterprise, or service quality of the services provided by the enterprise. The service quality of the services provided by the enterprise might be measured and monitored by Monitoring and Alarming frameworks (e.g., Sentry, Log 4j, or the like).

In yet another aspect, a system might be provided for implementing a business services dashboard. The system might comprise a telecommunications network and a server operatively coupled to the telecommunications network. The server might comprise a processor and a non-transitory computer readable medium having stored thereon software comprising a set of instructions that, when executed by the processor, causes the server to perform one or more functions. The set of instructions might comprise instructions to define one or more relationships between at least one technology service and at least one business service provided by an enterprise, and instructions to receive data associated with one or more real-time technical events corresponding to a changed condition in one or more of the at least one technology service utilizing at least one technology asset. Each defined relationship might indicate a dependence on one or more of the at least one technology service by one or more of the at least one business service. The set of instructions might also comprise instructions to identify, based on the one or more defined relationships between the at least one technology service and the at least one business service, one or more business events that impact the at least one business service of the enterprise, as a result of the one or more real-time technical events that correspond to the changed condition in the at least one technology asset. The set of instructions might further comprise instructions to generate at least one business user view including identification of the one or more business events and instructions to send the at least one business user view to a first set of user devices associated with one or more first users, over the telecommunications network, for display on the first set of user devices.

In still another aspect, an apparatus might be provided for implementing a business services dashboard. The apparatus might comprise a processor and a non-transitory computer readable medium having stored thereon software comprising a set of instructions that, when executed by the processor, causes the apparatus to perform one or more functions. The set of instructions might comprise instructions to define one or more relationships between at least one technology service and at least one business service provided by an enterprise and instructions to receive data associated with one or more real-time technical events corresponding to a changed condition in one or more of the at least one technology service utilizing at least one technology asset. Each defined relationship might indicate a dependence on one or more of the at least one technology service by one or more of the at least one business service. The set of instructions might also comprise instructions to identify, based on the one or more defined relationships between the at least one technology service and the at least one business service, one or more business events that impact the at least one business service of the enterprise, as a result of the one or more real-time technical events that correspond to the changed condition in the at least one technology asset. The set of instructions might further comprise instructions to generate at least one business user view including identification of the one or more business events and instructions to send the at least one business user view to a first set of user devices associated with one or more first users, over the telecommunications network, for display on the first set of user devices.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
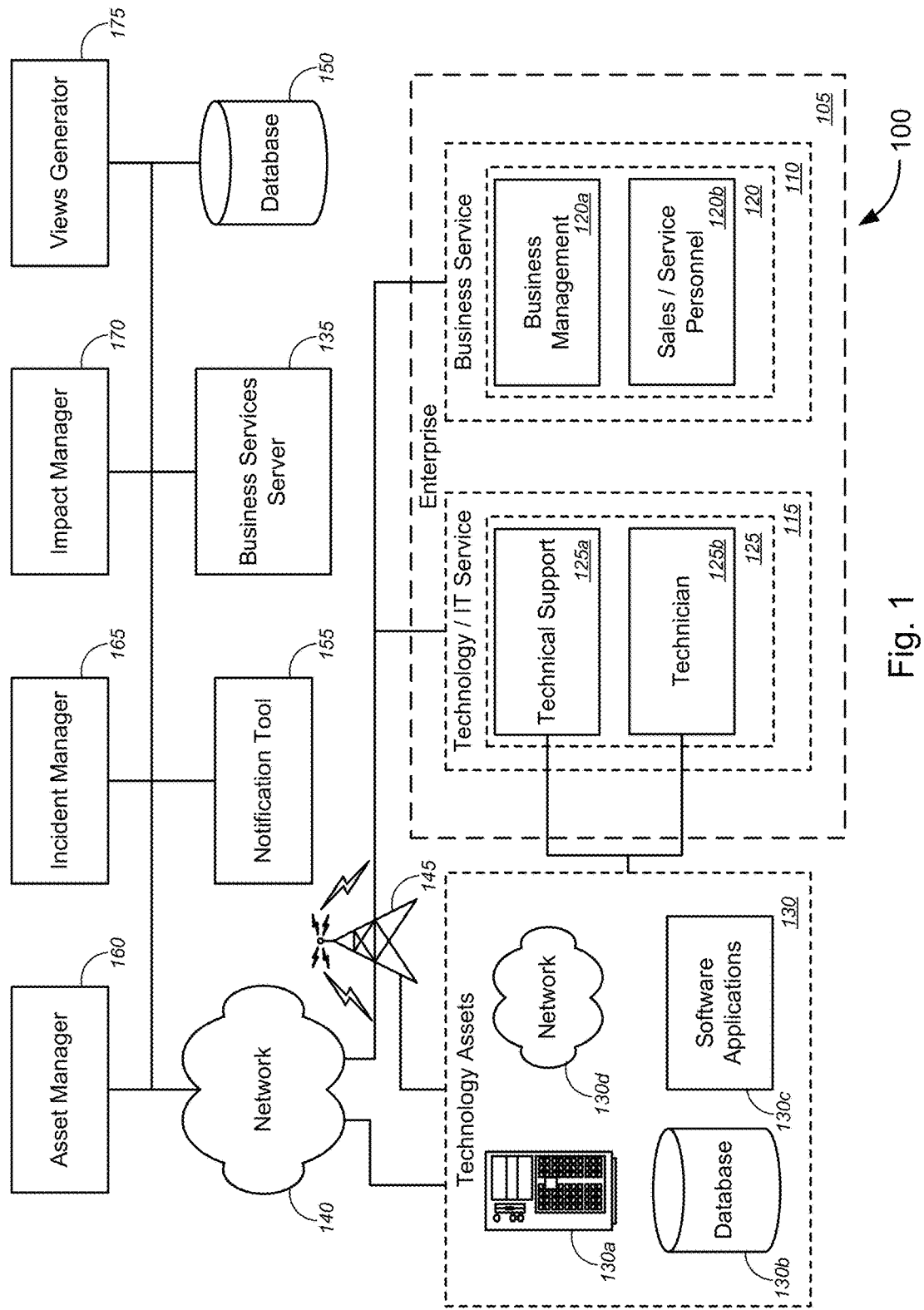
FIG. 1 is a general schematic diagram illustrating an exemplary system for implementing a business services dashboard, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for implementing a business services dashboard ("BSD"). According to various embodiments, a BSD might receive data related to real-time technical events (e.g., IT events or other technical events) corresponding to a changed condition in one or more technology services, and might define relationships between one or more technology services and one or more business services. In some instances, the relationships might be defined using unified modeling language ("UML"), other appropriate modeling techniques, or the like. The BSD might identify, based at least in part on the defined relationships, one or more business events that impact the one or more business services as a result of the real-time technical events.

The BSD, in some cases, might present real-time states of business-critical services, and might relate the real-time states of the business-critical services to the health of the underlying infrastructure and applications of the enterprise. The BSD might provide essential contact details, as well as actionable information for sustaining service, or the like. According to some embodiments, the BSD might also assign user groups comprising groups of users across every level of business and across every level of the technical environment, and might deliver role-based views to such user groups across every level of the business, across all layers of the technical environment. Accordingly, users across the organization (whether in a business group or a technology group, or the like) can view the type and level of information that corresponds to their business roles within the business enterprise.

The BSD, in various embodiments, might also represent a complete end-to-end view of business services, their interdependencies, and their availability, and might provide a business continuity plan to the business by aligning the business services to appropriate models (including, but not limited to, such models as the Enhanced Telecom Operations Map ("eTOM")). In some cases, the BSD may simplify problem isolation and may improve business service availability. It might also measure and track adherence to the service level agreements ("SLAs") or service level commitments, and might facilitate meeting business objectives by providing high-level real-time views of a company's various business services.

According to various aspects, the BSD might provide significant improvement in customer and/or business satisfaction. The BSD might help technical and/or business groups to find business pain points—which are real or perceived problems associated with the business—and might help the technical and/or business groups to make strategic and tactical decisions. In accordance with some embodiments, a BSD might include, without limitation, the following features: (1) providing incident and problem management; (2) optimizing level of service; (3) providing a single platform; (4) providing user management; (5) providing availability management; (6) providing asset and configuration management; (7) providing application dependency mapping products; (8) providing a complete end-to-end view of service availability; and (9) presenting dashboards and provides reporting.

Regarding (1), the BSD may be uniquely placed to determine the business impact of any potential technology failure. Typically, Information Technology ("IT") organizations might first hear of a customer facing IT problems from a service desk, or from business leaders calling their IT counterparts. After the IT organization becomes aware of the problem and escalates to the proper level, it is critical to be able to quickly find the root cause. The BSD might rapidly identify service performance issues, as well as their business impacts.

Regarding (2), the BSD might allow users to gain instant visibility of the overall business service health through real-time updates of service availability, including drill-down for more granular service details—including, without limitation, application owner contact information based on application issue, business impact, and problem resolution with estimated time to resolve issues with the business service. The BSD, in some cases, might increase IT efficiency and productivity through rapid problem detection and resolution, and might minimize the business impact of service outages by prediction on the data that might cause the outage, identifying the application owner, or the like.

Regarding (3), the BSD, according to some embodiments, might provide a single platform for all the stockholders, stakeholders, and/or business customers to synchronize with when resolving a business issue, along with providing updates on status of the services, which might help in solving the inability of IT groups to effectively report and communicate with business customers.

Regarding (4), the data from a Business Service Management solution is consumed by diverse audiences, ranging from business unit heads, who have a heavy reliance on IT, to IT practitioners, who are actually fixing problems. Different roles require different types of data. For example, it may be pointless to show a business owner data such as the number of alerts of differing severities, what services are used by what applications, or the like. Further, because not all users are going to be looking at a dashboard continually, the BSD may, in some cases, proactively notify the various users of any current or impending service quality issues, including making these notifications more business-relevant by augmenting them with business-impact information.

Regarding (5), the BSD might provide measures of the outages, service level agreements ("SLAs"), availability etc. The BSD might report such measures on a scheduled basis or based on availability metrics at a business level to ensure that the services are meeting customer needs.

Regarding (6), the BSD might implement a plug-in for already existing assets in a company or business—including, but not limited to, notification mechanisms, incident management systems, etc.—and might integrate with these existing assets to add further information to the service model. In some cases, the BSD might receive data from multiple configuration management databases to provide an overall view of business service.

Regarding (7), service quality is a measure of how well that business service is meeting expectations. The underlying infrastructure could be available 100 percent of the time, but if the users are not able to do their jobs during core operating hours, then the service should be regarded as unavailable. The BSD might measure service quality by creating a logical model of how the back-end infrastructure might impact the services. This information may be used for continual service improvement and for setting business-relevant SLAs.

Regarding (8), the BSD might provide a complete end-to-end view of service availability that might be completely aligned with the needs of the business, which might allow business managers to prioritize and/or make effective decisions. Without understanding how IT impacts the business, organizations may be unable to isolate the root-cause quickly, determine the priority, and allocate the right resources to fix problems, resulting in a costly, inefficient approach.

Regarding (9), the BSD might provide role-relevant dashboards and reports to proactively manage application performance and demonstrate the value of IT to line of business counterparts, including service-level compliance and continual service improvement. Scheduled reports for different roles of stockholders, stakeholders, and/or business customers might help the stockholders, stakeholders, and/or business customers determine the trend in the business service quality, and might empower IT management to be more agile in responding to business needs by understanding how IT contributes to business success, ensuring SLA requirements are met, leveraging existing IT investments, resolving IT problems according to business criticality, and improving service quality.

Herein, the terms "business continuity solution" or "business continuity plan" might refer to a workaround provided to make sure that the business is not affected due to non-availability of a business service and/or a technology service. Such business continuity solution or plan might include usage of a different business to realize the same business goal or a different functional flow altogether. For example, if a quoting business service is down due to non-availability of an IT service, the workaround provided might include obtaining the price of services from billing services.

Herein also, the terms "Monitoring framework," "Alarming framework," "Service Alarming framework," or "Monitoring and Alarming frameworks" might refer to frameworks that might monitor the health of one or more services and/or raise an alarm whenever there is a change in the pre-configured state of the one or more services. Examples of Monitoring and Service Alarming frameworks include Sentry, Log 4j, or the like. The term "stakeholder" herein might, in some cases, refer to a business group, a technology group, and/or users in one or both of the business group or technology group.

The Business Services Dashboard system and method described herein may be applicable to various industries, including, without limitation, the telecommunications industry, the banking industry, any suitable industry in which IT and business depend on each other, or the like.

For example, in the telecommunications industry, a customer might order any telecommunications product from a storefront, via telephone, or via the Internet. There might be a series of tasks involved in creating a new order for any product (e.g., a new telephone line). For instance, if a customer creates a new telephone line order through the Internet, a first application that the customer interacts with might be a sale portal ("Application A"). The sale portal might redirect data downstream to collect customer order information (including, for example, type of product, installation address, any special requirements, or the like). The series of tasks may require satisfying pertinent customer requests from the selling processes ("Application B"), in particular taking into account the purchase order from negotiated sales. The series of tasks may require, as a result of requests for customer provisioning activity ("Application C"). The series of tasks might also require an application to validate customer order information related to customer location, product information, and configuration ("Application D"). The issued customer order may require a feasibility assessment, may require new provisioning activities, may require a change to a previously issued customer order, or may require cancellation of a previously initiated customer order again. For the multiple applications involved, the series of tasks might need an application that can construct a flow through order based on customer information, current associated products, and requested new products ("Application E"). The series of tasks might also send data to multiple other applications related to customer order handling and billing activities.

Application E (i.e., the flow through application) might have multiple modules which may be deployed on multiple servers on a clustered environment. In an example, one of the modules that create telephone line service orders might experience an out of memory error or exception, which might be caused either by large amounts of data processing, requests that run indefinitely, or configuration issues, and the like. This event might be captured through monitoring tools including Sentry, Performance Command Center ("PCC"), or a log file monitoring tool or similar monitoring and performance tools. These tools might send an alarm and/or event that might be received by the BSD.

The BSD might provide configurable views to IT teams to associate the alarms and/or events to IT functionalities. Hence, when an alarm and/or event is received, the IT functionality might either be turned off (e.g., showing in RED on the dashboard) or depict one or more performance issues (e.g., showing in YELLOW on the dashboard).

The BSD might allow configuring the business services in different levels with inter-business process relationships. For example, in the case of the telecommunications business utilizing eTOM, the BSD might allow configuring eTOM up to level 5, where the telecommunications provider can configure its business services up to level 5. IT functionalities might be mapped to business services at level 4 or level 5 (or any other level of eTOM).

When IT functionality and/or service is changed to RED or YELLOW, the BSD might show the eTOM model from level 0 to level 5 with related business services. User/Group configurations might help deliver the right information to the right business or IT groups. Modules including asset manager, incident management system, and notification module might help in providing details including, but not limited to, business impact, workarounds for business continuity, downtimes, expected times to resolve outages, impacted upstream or downstream applications, incident case numbers (which might be useful in obtaining the latest outage resolution progress details, etc.), or the like.

In the given example of the telephone line order above, if the telephone line order construction service is down, then the BSD might show this in RED, and might send notifications to stake holders (e.g., business group users) or business customers who are involved in order creation at the storefront, using an interactive voice response ("IVR") system over a telephone, at a call center, or at a web support team location. IT teams can start a call to resolve an outage and update real-time information to case tools so that business teams can view the information.

Without BSD, if the service goes down, the Internet might throw an exception, and the call center might contact the web portal support team. The web portal support team might try to find the cause of the issue and might then redirect to Application A support team. Application A support team might investigate the issue and might then redirect to Application B support team, and so on, until the correct application support team becomes involved. This whole process might take a lot of time, which might result in service unavailability to customers for a long time. Business groups are not typically involved in any of these steps. Hence, business group users might not know the root causes, workarounds, or estimated times to resolve outages. Accordingly, this might impact relationships and coordination between the business groups and the IT groups, eventually resulting in revenue loss.

We now turn to examples related to the banking industry. As a threshold matter, banks provide multiple banking products and services including, without limitation, checking accounts, savings accounts, check cards, home mortgage, wealth management, insurance, loans, prepaid cards, and the like. All these products may be accessible either through the bank's website, through visits to the bank, or by calling the bank's telephone services. In the case that the customer wants to apply for a home mortgage, the customer might go to the bank's web portal, which might redirect the customer to another application dealing with mortgage requests ("Application A"). Based on the customer's requirements (e.g., buying a new home, first time buyer, refinancing a home, etc.), Application A might redirect the customer to another application, such as one pertaining to buying a new home ("Application B"). Application B might further redirect the customer to mortgage pre-qualification ("Application C") and pre-approval ("Application D") to determine what the customer can afford. An application for process checklist ("Application E"), closing cost calculations ("Application F"), and multiple applications hierarchy for loan processing, appraising, underwriting, and closing might be required for the mortgage product.

In an example in which an application that creates mortgage accounts is hosted on a clustered environment, and one of the servers is running with low disk space, resulting in unavailability of the server and the application, a monitoring service (including, but not limited to, Sentry, PCC, or any similar monitoring tool, or the like) might send an alarm and/or event. The BSD might receive the alarm and might indicate the IT service for mortgage loan creation as being unavailable, by showing it in RED.

A bank, as per their operations, can define business services and services hierarchy. BSD allows the bank to configure the business services in multiple levels (up to level 5). For example, at level 4 or level 5, the business service might be mapped with IT functionality or IT services. The BSD might turn down the business service (or indicate the business service as being down), by showing it in RED, as soon as the BSD identifies the IT service associated with the business service is down, based on an event and/or alarm. All involved business stakeholders might be notified and modules (including, without limitation, an asset manager, an incident management system, and a notification module) might help in providing details including, but not limited to, business impact, workarounds for business continuity, downtimes, expected times to resolve outages, impacted upstream or downstream applications, incident case numbers (which might be useful in obtaining the latest outage resolution progress details, etc.), or the like.

FIGS. 1-9 illustrate some of the features of the method, system, and apparatus for implementing a business services dashboard as referred to above. The methods, systems, and apparatuses illustrated by FIGS. 1-9 refer to examples of different embodiments that include various components and steps, which can be considered alternatives or which can be used in conjunction with one another in the various embodiments. The description of the illustrated methods, systems, and apparatuses shown in FIGS. 1-9 is provided for purposes of illustration and should not be considered to limit the scope of the different embodiments.

FIG. 1 is a general schematic diagram illustrating an exemplary system 100 for implementing a business services dashboard, in accordance with various embodiments. In FIG. 1, system 100 might comprise an enterprise 105, which might comprise one or more business services 110 and one or more technology or IT services 115. The one or more business services 110 might each comprise one or more business user groups 120, which might comprise business management 120a and sales/service personnel 120b, or the like. The one or more technology services 115 might each comprise one or more technology user groups 125, which might comprise technical support 125a and technicians 125b, or the like.

System 100 might further comprise technology assets 130, including, but not limited to, one or more servers 130a, one or more databases 130b, one or more software applications 130c, and one or more networks 130d, or the like, which might be associated with the one or more business services 110, the one or more technology services 115, or both.

In some embodiments, system 100 might comprise a business services server 135 coupled with each of the one or more business services 110 and the one or more technology or IT services 115 of the enterprise 105 via a network 140. Network 140 might be any suitable network, including, but not limited to, a local area network ("LAN"), a wide-area network ("WAN"), a wireless wide area network ("WWAN"), a virtual private network ("VPN"), the Internet, or the like. In some cases, a wired connection (including, without limitation, optical fiber connection, copper wire connection, cable connection, and/or the like) may be made between the business services server 135 and each of the one or more business services 110 and the one or more technology services 115. Alternatively, or in addition, a wireless connection may be implemented between the business services server 135 and the services 110, 115, via telecommunications relay systems 145, which might include, without limitation, one or more wireless network interfaces (e.g., wireless modems, wireless access points, and the like), one or more towers, one or more satellites, and the like.

The system 100 might further comprise one or more databases 150, a notification tool 155, an asset manager 160, an incident manager 165, an impact manager 170, and a views generator 175. In some embodiments, the notification tool 155 might deliver messages to a set of recipients, based on events and/or rules. The message delivery might, in some cases, be via e-mail, pager, web notification, rich site summary ("RSS") feed, desktop alert, or the like. In some instances, the notification tool 155 might interact with the asset manager 160 to find server, application, or database support contacts to automate notification processes, based on a set of rules.

The asset manager 160 might, in some embodiments, be a company's primary repository for operational information regarding technology assets, and might comprise detailed hardware and software inventory information, which might be used to make decisions about hardware and software purchases, redistribution, and optimized usage. The asset manager 160 might help an organization to manage its systems more effectively, thus saving time and money, by eliminating unnecessary purchases and wasted resources. The asset manager 160 might comprise one or more of a master application list ("MAL"), a master database list ("MDL"), an inventory of midrange servers and related components, an inventory of mainframes and mainframe partitions, an inventory of personal computers and printers, an inventory of storage devices, a datacenter spare parts inventory, a datacenter environmental equipment inventory, and a network inventory. The MAL might comprise information including, but not limited to, application description, application dependency, SLA, business impact and workaround in outage situations, platform or servers that applications run on, databases being used, application development, and support contacts, or the like. The MDL might comprise information including, without limitation, database name, database cluster, server(s) that the database runs on, applications owning the database, and development and/or production database administration ("DBA") contact information, or the like.

The incident manager 165 (otherwise referred to as the incident management system) might identify issues that might cause incidents, which are events that cause interruption or reduction to the quality or availability of a service. The incident manager 165 might, in some cases, also restore normal operation within short time frames, as outlined in the SLA. Activities of an incident management process implemented by the incident manager 165 might include, without limitation, incident detection and recording, classification and support, investigation and diagnosis, resolution and recovery, incident closure, and incident ownership, monitoring, tracking, and communication. In some embodiments, the incident manager 165 might communicate with asset manager 160, in order to at least monitor or track incidents associated with one or more technology assets 130.

The impact manager 170 might gather events through one or more different feeds, including, but not limited to, enterprise log and process monitoring systems, application profilers, performance command center ("PCC"), and the like. Based on the one or more different feeds, the impact manager 170 might determine impacts of such events at application and business service levels. In other words, the impact manager 170 might determine one or more business events that might impact at least one business service provided by the enterprise or business as a result of the events gathered through the one or more different feeds. In some cases, tools such as asset manager 160 and an event generator might automatically gather and maintain a wealth of data, and the impact manager 170 might collect these scattered data and provide a meaningful dataset for the BSD. According to some embodiments, the impact manager 170 might read real-time generated events, read real-time application profiler/PCC data, determine severity and impacts of each event, and convert severity and impact into meaningful business service and application impacts (sometimes referred to as business events).

The views generator 175 might generate one or more of an enterprise service view (otherwise referred to as an end-to-end enterprise view), one or more business group views, one or more technology group views, or one or more user specific views. For the enterprise service view, the views generator 175 might associate the business service or application to a larger view of the enterprise and might represent the larger view along with upstream or downstream applications or services. By providing and monitoring relationships among other applications and business services, the system 100 allows IT or technology group managers to more closely align IT with business, and also helps the managers to prioritize their IT intakes for better business stability. In some cases, the views generator 175 might determine and associate impacts at the enterprise model level, and might represent end to end enterprise views of applications with their associated impacts. For user groups or individual users, the views generator 175 might present information in a form that is easy to understand, and that might provide meaningful information and metrics to the receiving users and groups (e.g., as shown in the example user interface in FIG. 7, or the like). For example, the views generator 175 might deliver information that is appropriate to a user's functional organization, the user's role in that organization, and the user's management level. According to some embodiments, the views generator 175 might generate views based on user/group configurations, utilize JQuery based graphical user interface ("GUI") framework to generate dynamic web views, display traffic light notations to indicate the status of the business services (e.g., with available services shown in Green, unavailable services shown in Red, and slow-running services shown in Yellow), collate information from asset manager 160, incident manager 165, and impact manager 170 to provide meaningful data and metrics, and provide vital information in outage scenarios. In some embodiments, the vital information in outage scenarios might include, without limitation, service name and detail, related application and its detail, business impact, workaround for business continuity, down time, estimated or expected time to resolve outage ("ETRO" or, generically, "ETA"), incident case number for finding out the latest details regarding progress of outage resolution, or IT or technical support group details (i.e., business groups can contact the technical groups to obtain more information), or the like.

According to some embodiments, in implementing a business services dashboard, the business services server 135 might define one or more relationships between at least one IT or technology service and at least one business service provided by an enterprise. Each defined relationship might indicate a dependence on one or more of the at least one IT or technology service by one or more of the at least one business service. In some cases, defining the one or more relationships might comprise defining the one or more relationships between the at least one IT or technology service and the at least one business service using a modeling tool—including, without limitation, unified modeling language ("UML") or the like.

The incident manager 165 and/or the business services server 135 might receive data associated with one or more real-time IT or technical events, which might correspond to a changed condition in each of the at least one IT or technology service. As described above, the events might be generated or identified using event generation tools including, but not limited to, Sentry, Application Profiler, PCC, or the like. Such tools might allow users to define rules and thresholds for events, which might not only identify outages, but might also report a potential threat that could lead to outage and/or service unavailability. In some instances, the at least one IT or technology service might comprise at least one service utilizing at least one technology asset. The at least one technology asset might comprise at least one of one or more software applications 130c, one or more servers 130a, one or more databases 130b, or one or more networks 130d that might be associated with services provided either by the enterprise or by a service provider separate from the enterprise.

The incident manager 165 and/or the business services server 135 might identify one or more technical issues associated with the changed condition in the at least one IT or technology service, based at least in part on the data associated with the one or more real-time IT or technical events. The incident manager 165 and/or the business services server 135 might also identify a severity level for each of the one or more technical issues as they impact the at least one IT or technology service, as they impact the at least one technology asset, or both. The incident manager 165 and/or the business services server 135 might further identify (perhaps based on a database of technical issues and technical solutions to those issues, e.g., as stored in database 150 or the like) one or more proposed or potential technical solutions to the solutions to the one or more technical issues.

The impact manager 170 and/or the business services server 135 might identify, based on the one or more defined relationships between the at least one IT or technology service and the at least one business service, one or more business events that impacts or might impact the at least one business service of the enterprise as a result of the one or more real-time IT or technical events corresponding to the changed condition in the at least one IT service. The impact manager 170 and/or the business services server 135 might also identify a severity level for each of the one or more technical issues as they impact the business services.

The business services server 135 might assign user groups comprising at least one business group and at least one technical group, based on roles of the at least one business group and the at least one technology group in the business process of the enterprise. For example, the user groups could be assigned such that business managers (who manage some aspect of the business) might be grouped into a business management group 120a, sales or service personnel (who sell goods or services) might be grouped into a sales/service personnel group 120b, technical support staff (e.g., in-store technical support, call center technical support, Internet chat-based technical support, or the like who provide support for goods or services) might be grouped into a technical support group 125a, and technicians or repair personnel (who fix or repair technology assets to resolve outages or the like) might be grouped into a technician group 125b, or the like.

The views generator 175 and/or the business services server 135 might generate a plurality of views, which might comprise at least one business user view and at least one technical user view. In some cases, the plurality of views might further comprise an enterprise service view or an end-to-end enterprise view (as described above). The at least one business user view might be generated based on a first configuration associated with the at least one business group 120, and might include identification of the one or more business events that might impact the at least one business service of the enterprise as a result of the one or more real-time IT or technical events. In some cases, the at least one business user view might further include one or more of workarounds for business continuity, estimated downtimes, estimated times to resolve outage, incident case number (for easy retrieval of latest outage resolution progress details and updates), or contact information for IT or technical group members, or the like. According to some embodiments, the at least one business user view might further include one or more of identification of a measure of any service outages resulting from the changed condition in the at least one technology asset, identification of relevant service level agreements ("SLAs") associated with the at least one technology asset or the services provided by the enterprise, summary of availability of the services provided by the enterprise, or service quality of the services provided by the enterprise. The service quality of the services provided by the enterprise might be measured and monitored by Monitoring and Alarming frameworks, which might include, but is not limited to, Sentry, Log 4j, or the like.

The at least one technical user view might be generated based on a second configuration associated with the at least one technical group 125, and might include identification of the one or more technical issues, identification of the severity level for each of the one or more technical issues, and identification of the one or more proposed technical solutions. In some instances, the at least one technical user view might further include one or more of service name and detail, related applications and their details, estimated downtimes, estimated times to resolve outage, incident case number (for easy retrieval of latest outage resolution progress details and updates), or contact information for other IT or technical group members, or the like.

The notification tool 155 and/or the business services server 135 might send the at least one business user view to a first set of user devices (e.g., user devices 185 shown in FIG. 3) associated with one or more members of the at least one business group (e.g., members of the business management group 120a and/or members of the sales/services personnel group 120b, or the like). The at least one business user view may then be displayed on the display screen(s) of the first set of user devices as a BSD (similar to the BSD as shown, e.g., in FIG. 7). The notification tool 155 and/or the business services server 135 might also send the at least one technical user view to a second set of user devices (e.g., user devices 190 shown in FIG. 3) associated with one or more members of the at least one IT or technology group (e.g., members of the technical support group 125a and/or members of the technician group 125b, or the like). The at least one technical user view may then be displayed on the display screen(s) of the second set of user devices as a BSD (similar to the BSD as shown, e.g., in FIG. 7).

As updates are received (in real-time) by the incident manager 165, the impact manager 170, and/or the business services server 135, the views generator 175 might generate updated views (and in some cases, updated real-time views) of the at least one business user view and/or the at least one technical user view. The notification tool 155 and/or the business services server 135 might send the updated views (or updated real-time views) to the first or second sets of user devices, respectively.

In some embodiments, the business services server 135 and/or the impact manager 170 might identify or associate one or more business continuity solutions with the one or more proposed or potential technical solutions, and might provide the one or more business continuity solutions to the user groups (i.e., the at least one business group 120, the at least one technical group 125, or both). The one or more business continuity solutions, in some cases, might at least partially address at least one of the one or more business events. In any case, the one or more business continuity solutions serve to ensure that the business continues despite the changed condition in the at least one technology asset 130.

In some examples, the impact manager 170 and/or the business services server 135 might determine one or more potential impending service quality issues that may result from the changed condition in the at least one technology asset, and might identify one or more potential impacts to the at least one business service of the enterprise as a result of the one or more potential impending service quality issues. The views generator 175 might update the at least one business user view to include the one or more potential impending service quality issues and the one or more potential impacts to the at least one business service of the enterprise as a result of the one or more potential impending service quality issues. The notification tool 155 might send the updated business user views to the first set of user devices over the network 140, for display on the display screen(s) of the first set of user devices.

According to some embodiments, each of the users in the business groups 120 and/or the technology groups 125 might be provided (by the business services server 135 and/or the notification tool 155) with options to define or customize notification mechanisms and user interface ("UI") views of the at least one business user view or the at least one technical user view, respectively.

The above described framework for implementing a business services dashboard may be scaled to any industry requirements, any vertical requirements, and/or any domain requirements as necessary and/or as appropriate.

Figure 2:
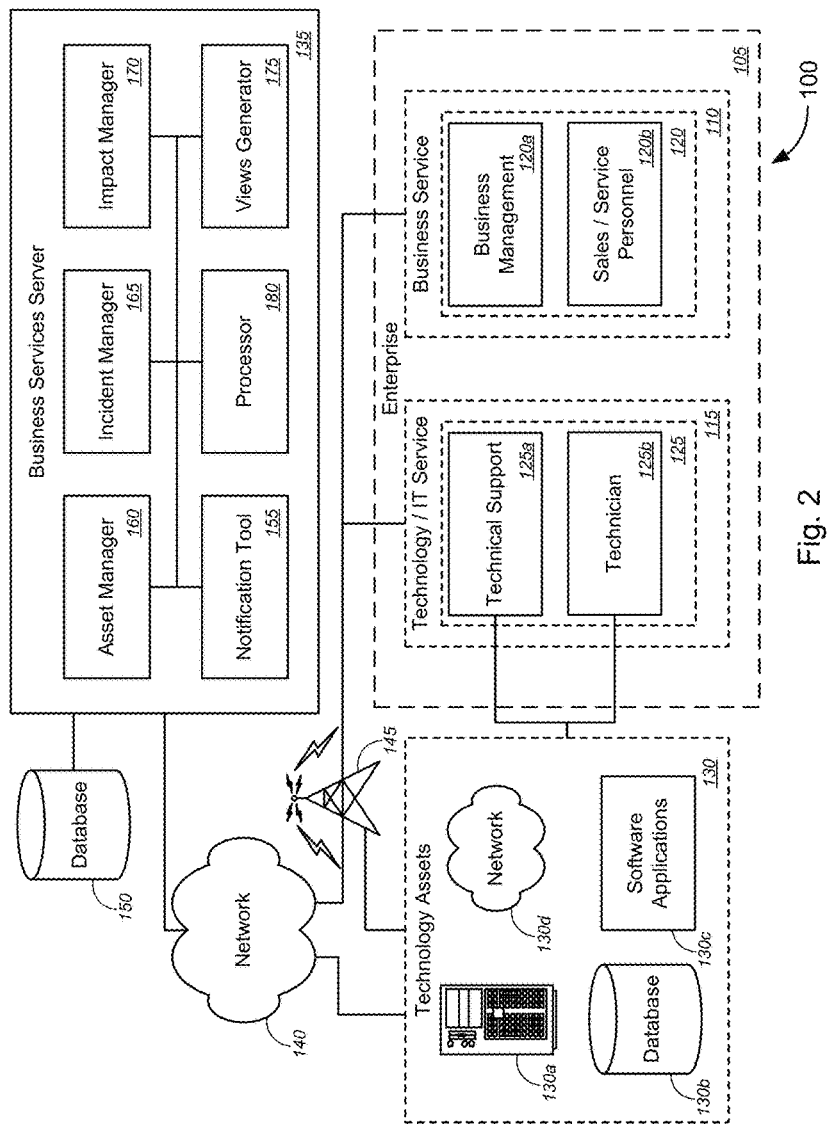
FIG. 2 is a general schematic diagram illustrating another exemplary system for implementing a business services dashboard, in accordance with various embodiments.

FIG. 2 is a general schematic diagram illustrating another exemplary system 100 for implementing a business services dashboard, in accordance with various embodiments. System 100 in FIG. 2 is similar to system 100 in FIG. 1, except that the notification tool 155, the asset manager 160, the incident manage 165, the impact manager 170, and the views generator 175 are embodied within the business services server 135. The business services server 135 might further comprise processor 180 that might execute software for causing the business services server 135 to perform the functions described above with respect to FIG. 1.

The system 100 in FIG. 2 might otherwise be similar to, if not identical, to the system 100 in FIG. 1 in terms of functionality, as described above.

Figure 3:
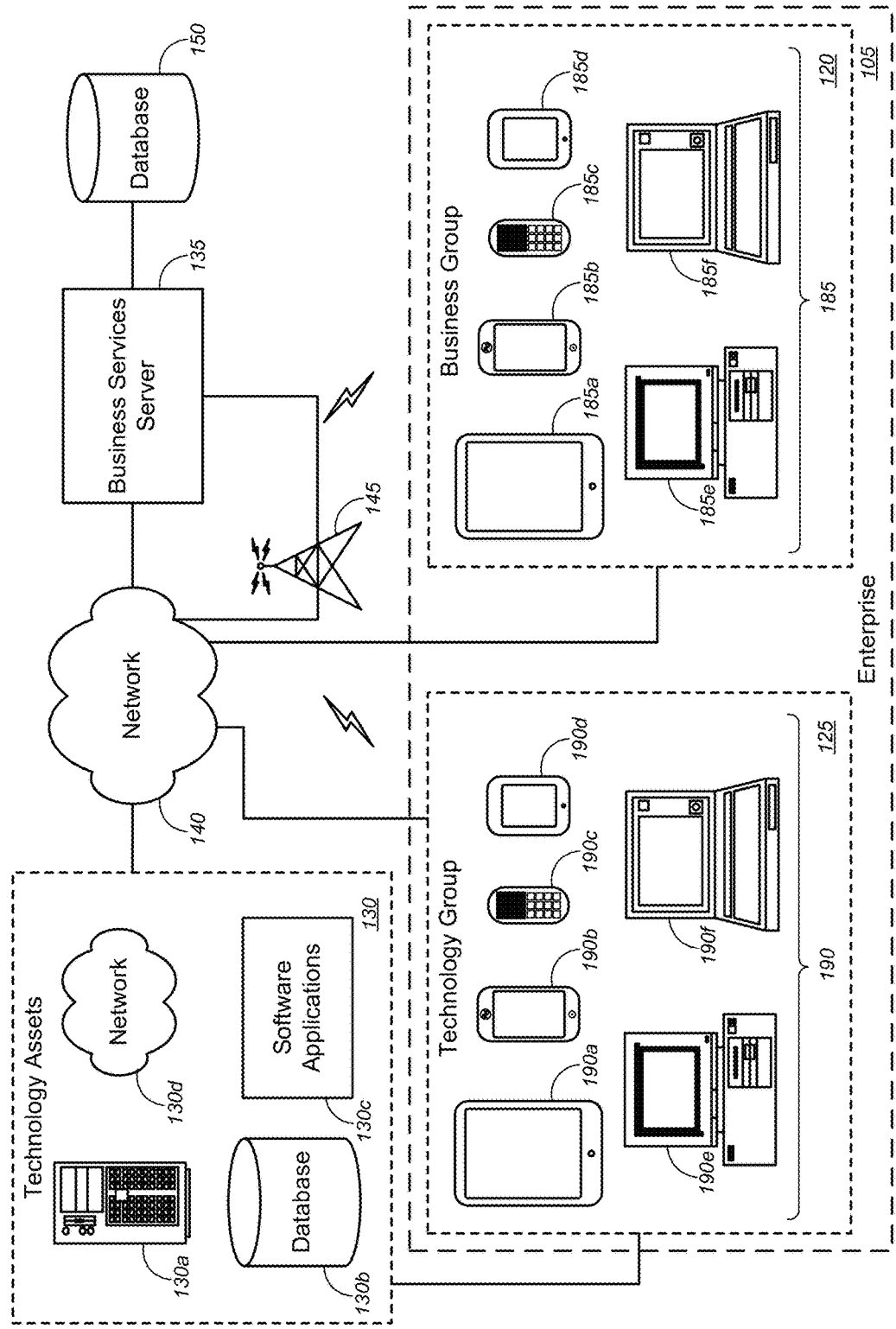
FIG. 3 is a general schematic diagram illustrating yet another exemplary system for implementing a business services dashboard, in accordance with various embodiments.

FIG. 3 is a general schematic diagram illustrating yet another exemplary system 100 for implementing a business services dashboard, in accordance with various embodiments. System 100 in FIG. 3 is similar to system 100 in FIG. 1 or system 100 in FIG. 2, except that the one or more business user groups 120 and the one or more technology user groups 125 are shown provided with one or more user devices 185, 190. For example, each business group user might be provided with one or more user devices 185, including, but not limited to, a tablet computer 185a, a smart phone 185b, a mobile phone 185c, a personal digital assistant ("PDA") 185d, a desktop computer 185e, a laptop computer 185f, or any other suitable user device, or the like. Similarly, each technology group user might be provided with one or more user devices 190, including, but not limited to, a tablet computer 190a, a smart phone 190b, a mobile phone 190c, a PDA 190d, a desktop computer 190e, a laptop computer 190f, or any other suitable user device, or the like.

The business services server 135 might be in wired or wireless communication with one or more of the user devices 185, 190 via network 140 (and in some cases, via telecommunications relay system 145). In some instances, the business services server 135 might present the user with the BSD on the displays of the user devices 185, 190, and might provide the user with role-specific, group-specific, and/or user-specific views on the displays. The business services server 135 might also provide options for the various users to customize the various views, to customize notification and reporting mechanisms, or the like.

The system 100 in FIG. 3 might otherwise be similar to, if not identical, to the system 100 in FIG. 1 in terms of functionality, as described above.

Figure 4:
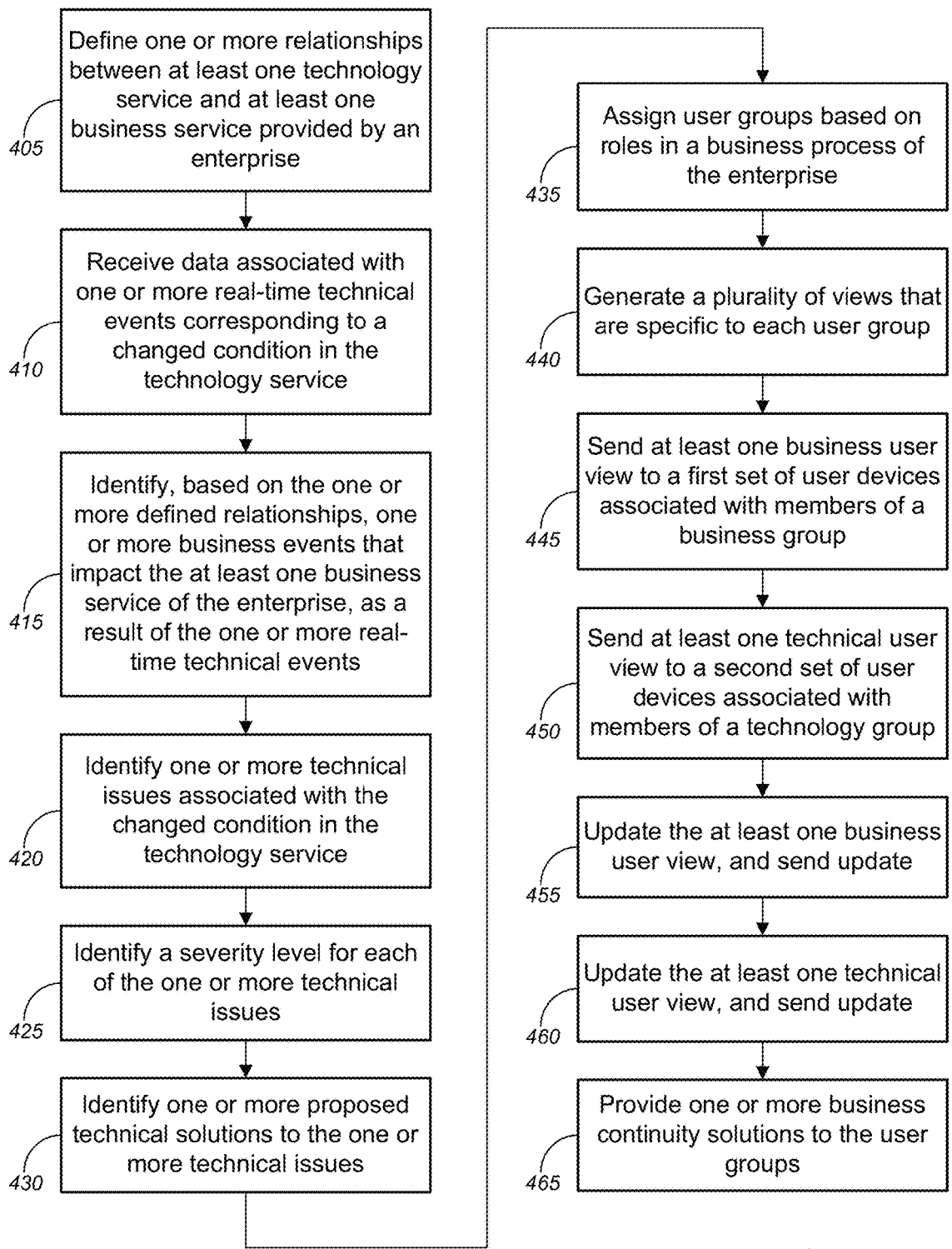
FIG. 4 is a flow diagram illustrating an exemplary method for implementing a business services dashboard, in accordance with various embodiments.

FIG. 4 is a flow diagram illustrating an exemplary method 400 for implementing a business services dashboard, in accordance with various embodiments. In FIG. 4, method 400 might comprise, at block 405, defining one or more relationships between at least one technology service and at least one business service provided by an enterprise. Each defined relationship might indicate a dependence on the at least one technology service by the at least one business service. At block 410, the method 400 might comprise receiving data associated with one or more real-time technical or IT events corresponding to a changed condition in the at least one technology service. In some embodiments, the at least one technology service might comprise at least one service utilizing at least one of one or more software applications, one or more servers, one or more databases, or one or more networks, or the like.

The method 400 might further comprise identifying, based on the one or more defined relationships, one or more business events that impact or might impact the at least one business service of the enterprise, as a result of the one or more real-time technical events corresponding to the changed conditions in the at least one technology service (block 415). The method 400 might also comprise identifying one or more technical issues associated with the changed condition in the at least one technology service, based at least in part on the data associated with the one or more real-time technical events (block 420), identifying a severity level for each of the one or more technical issues (block 425), and identifying one or more proposed or potential technical solutions to the one or more technical issues (block 430).

At block 435, the method 400 might comprise assigning user groups comprising at least one business group and at least one technical group, based on roles of members of the at least one business group and members of the at least one technical group in a business process of the enterprise. The method 400 might comprise, at block 440, generating a plurality of views that are specific to each user group or specific to each individual user in each user group. According to some embodiments, the plurality of views might comprise at least one business user view and at least one technical user view. The at least one business user view might be generated based on a first configuration associated with the at least one business group. In some cases, the at least one business user view might include identification of the one or more business events. In some embodiments, the at least one technical user view might be generated based on a second configuration associated with the at least one technology group. The at least one technical user view might, in some cases, include one or more of identification of the one or more technical issues, identification of the severity level for each of the one or more technical issues, and identification of the one or more proposed technical solutions.

At block 445, the method might comprise sending at least one business user view to a first set of user devices associated with one or more members of the at least one business group (e.g., user devices 185 shown in FIG. 3), for display on the first set of user devices. The method might further comprise sending, at block 450, at least one technical user view to a second set of user devices associated with one or more members of the at least one technology group (e.g., user devices 190 shown in FIG. 3), for display on the second set of user devices.

According to some embodiments, the method 400 might further comprise updating, and sending, the at least one business user view with a first update (block 455). The first update, in some cases, might correspond to updates (and, in some cases, real-time updates) to the identification of the one or more business events. In other cases, the first update might correspond to updates (and, in some cases, real-time updates) to other aspects of the at least one business user view (e.g., including, but not limited to, business-augmented displays of the technical events, changed conditions to the one or more technology services, technical issues, severity levels, and proposed technical solutions, or the like). At block 460, the method might comprise updating, and sending, the at least one technical user view with a second update. In some embodiments, the second update might correspond to updates (and, in some cases, real-time updates) to one or more of the identification of the one or more technical issues, the identification of the severity level for each of the one or more technical issues, and the identification of the one or more proposed technical solutions. In other embodiments, the second update might correspond to updates (and, in some cases, real-time updates) to other aspects of the at least one technical user view (e.g., including, but not limited to, IT-augmented displays of the business impacts or business events, or the like).

According to some embodiments, the method 400 might further comprise, at block 465, providing one or more business continuity solutions to the user groups. In some cases, the one or more business continuity solutions might be associated with the one or more proposed technical solutions, and might at least partially address at least one of the one or more business events.

Figure 5:
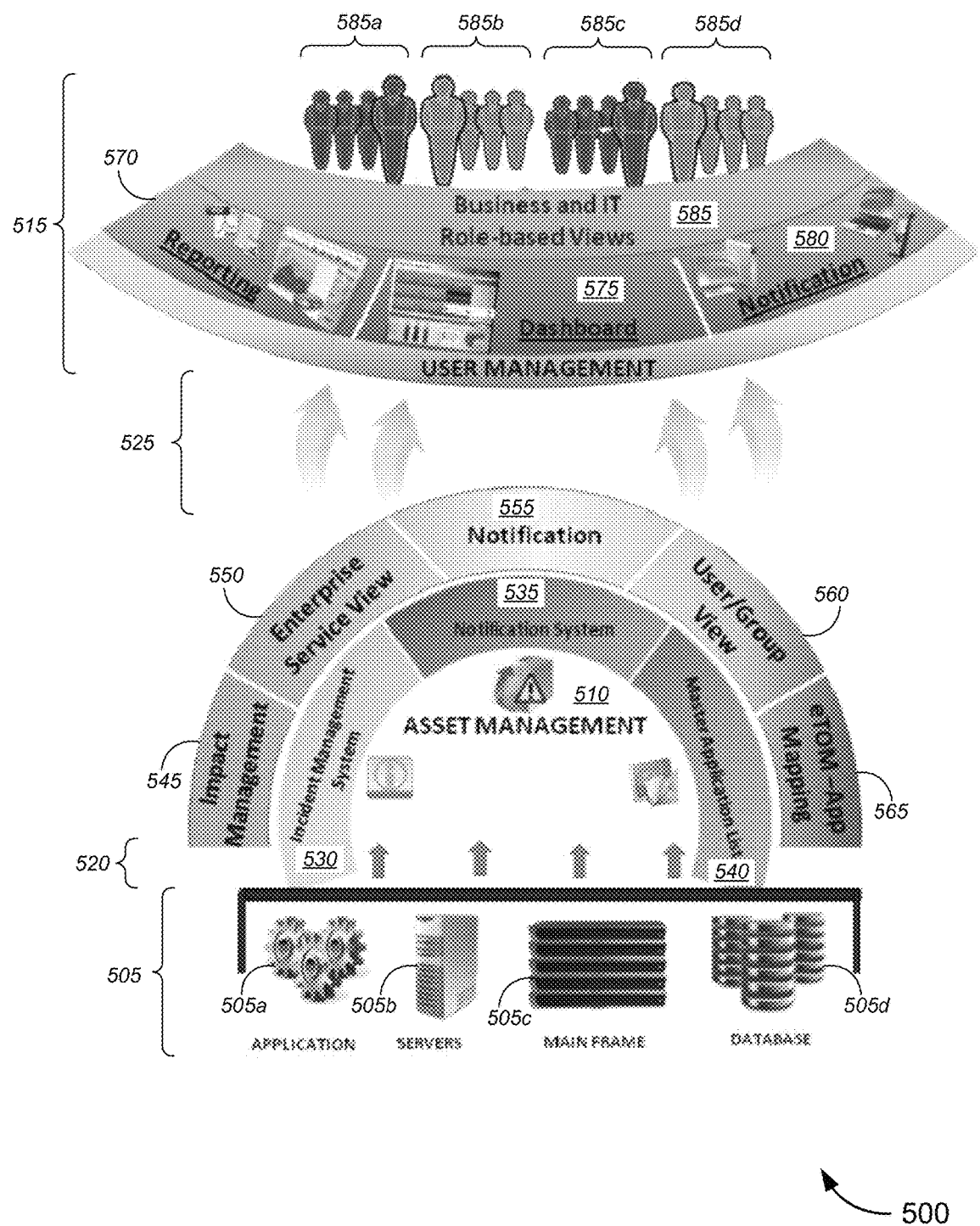
FIG. 5 is a general schematic diagram illustrating an exemplary system for implementing a business services dashboard, in accordance with various embodiments.

FIG. 5 is a general schematic diagram illustrating an exemplary system 500 for implementing a business services dashboard, in accordance with various embodiments. In FIG. 5, system 500 might comprise one or more technology assets 505 (including, without limitation, one or more applications 505*a*, one or more servers 505*b*, one or more mainframe computers 505*c*, and one or more databases 505*d*, or the like), which might be monitored using such monitoring frameworks as Sentry, AppProf, PCC, or the like. System 500 might further comprise an asset management system 510 and a user management system 515 that might be linked using one or more communications links 520, 525. For example, real-time events might be monitored by the monitoring frameworks, which might send data associated with the real-time events to the asset management system 510 via communications links 520. Likewise, information from the asset management system 510 might be sent to the user management system 515 via communications links 525.

In some embodiments, asset management system 510 might comprise, or might be operatively coupled to, one or more of an incident management system 530, a notification system 535, a master application list 540, an impact management system 545, an enterprise service view generator 550, a notification device 555, a user/group view generator 560, and an eTOM application mapping system 565, or the like. In some instances, the asset management system 510, the incident management system 530, the notification system 535/notification device 555, and the impact management system 545 might be similar in terms of structure and functionality as asset manager 160, incident manager 165, notification tool 155, and impact manager 170, respectively, as described above with respect to FIG. 1. The enterprise service view generator 550 and/or the user/group view generator 560 might be similar in terms of structure and functionality as views generator 175, as also described above with respect to FIG. 1. In some cases, the master application list 540 might be part of asset manager 160. As such, the systems and methods for implementing the BSD as described with respect to FIGS. 1-4 above may be applicable to the various components of, or coupled to, the asset management system 510.

The information generated by the asset management system 510, or components coupled thereto, might include, without limitation, data for displaying the technical user views, data for displaying the business user views, outage information, business events (e.g., impacts to business services, etc.), technical issues, potential technical solutions, severity information, estimated times for outage resolution, eTOM mapping data, business continuity information, or the like, which are described in detail above. Such information might be sent to the user management system 515, which might provide options for a user (e.g., a business group user, a technology group user, or the like) to define or customize notification settings/mechanisms and UI views. In particular, the user management system 515 might comprise a reporting system 570 and a notification customization system 580, which might allow the user to generate reports and customize notification settings and mechanisms for certain events or any of the information generated by the asset management system 510. For example, the user might select certain templates for generating the reports, and/or might select certain user devices (e.g., smart phone, laptop computer, and/or desktop computer) for receiving the user views or notification messages (including, e.g., e-mails, text messages, or the like). User management system 515 might further comprise a dashboard management system 575, which might allow a user to select and customize business and/or IT role-based views 585, which might include one or more business management user views 585*a*, one or more sales/service personnel user views 585*b*, one or more technical support user views 585*c*, and one or more technician user views 585, or the like.

The system 500 in FIG. 5 might otherwise be similar to, if not identical, to the system 100 in FIG. 1 in terms of functionality, as described above.

Figure 6:
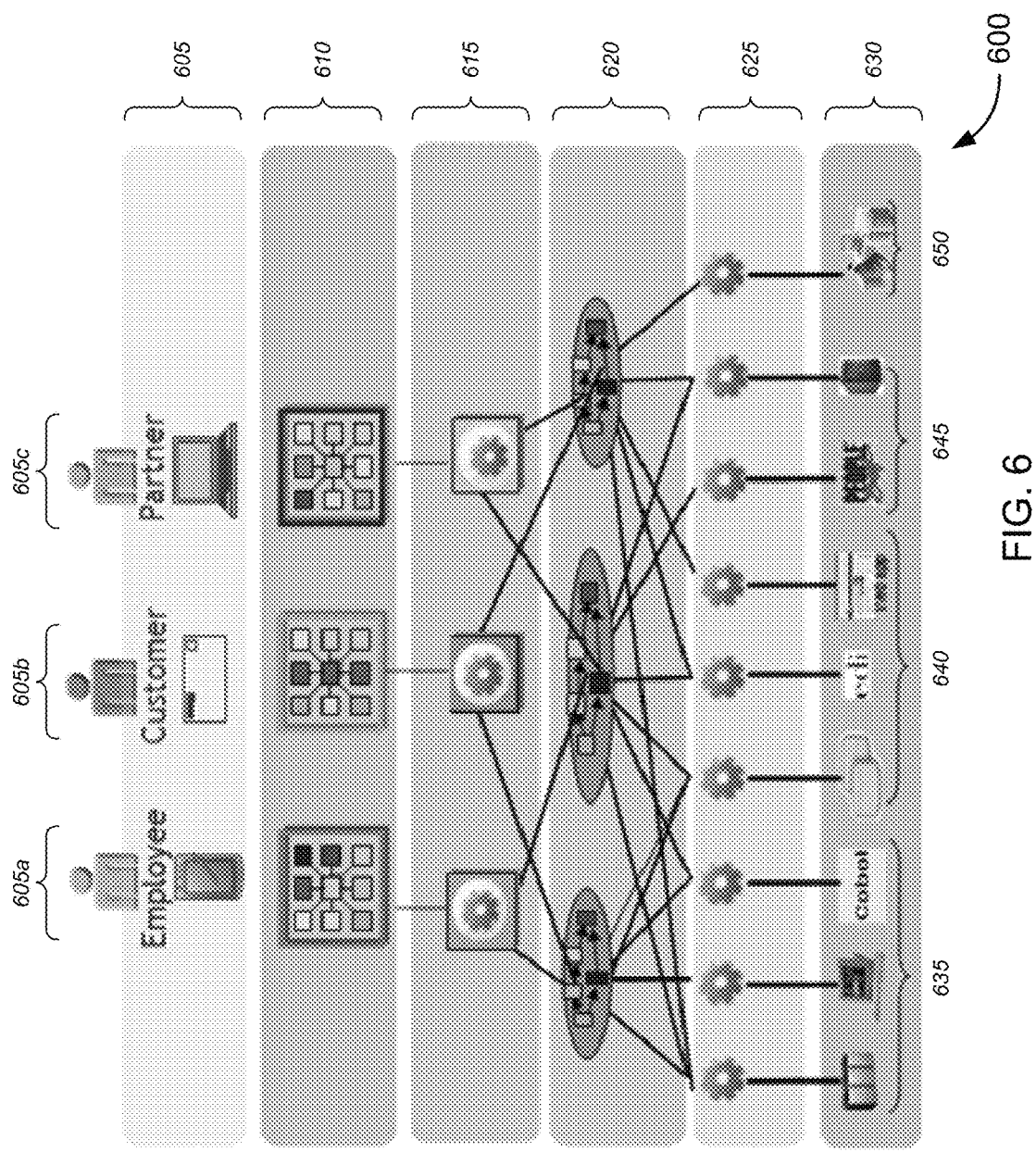
FIG. 6 is a general schematic flow diagram illustrating an exemplary system for implementing a business services dashboard, in accordance with various embodiments.

FIG. 6 is a general schematic flow diagram illustrating an exemplary system 600 for implementing a business services dashboard, in accordance with various embodiments. In FIG. 6, system 600 might comprise one or more end users 605, who might include one or more employees 605*a*, one or more customers 605*b*, and one or more business partners 605*c*. Each of the end users 605 might have displayed on associated user devices (e.g., smart phones, laptop computers, desktop computers, tablet computers, or the like) business services dashboards ("BSDs"), as described in detail above. The BSDs might identify various composite business services 610 associated with each type of end user 605; the composite business services 610 might be different for each type of end user 605. Each composite business service might be composed of various business-level services 615, which might likewise be different for each type of end user 605. For each of the business-level services 615, service orchestration 620 might be implemented to utilize various IT or technology assets 625 that might be exposed as services. Such IT or technology assets 625 might include various categories of assets 630, which might include legacy applications 65, existing infrastructure 640, packaged applications 645, and outsourced services 650.

Figure 7:
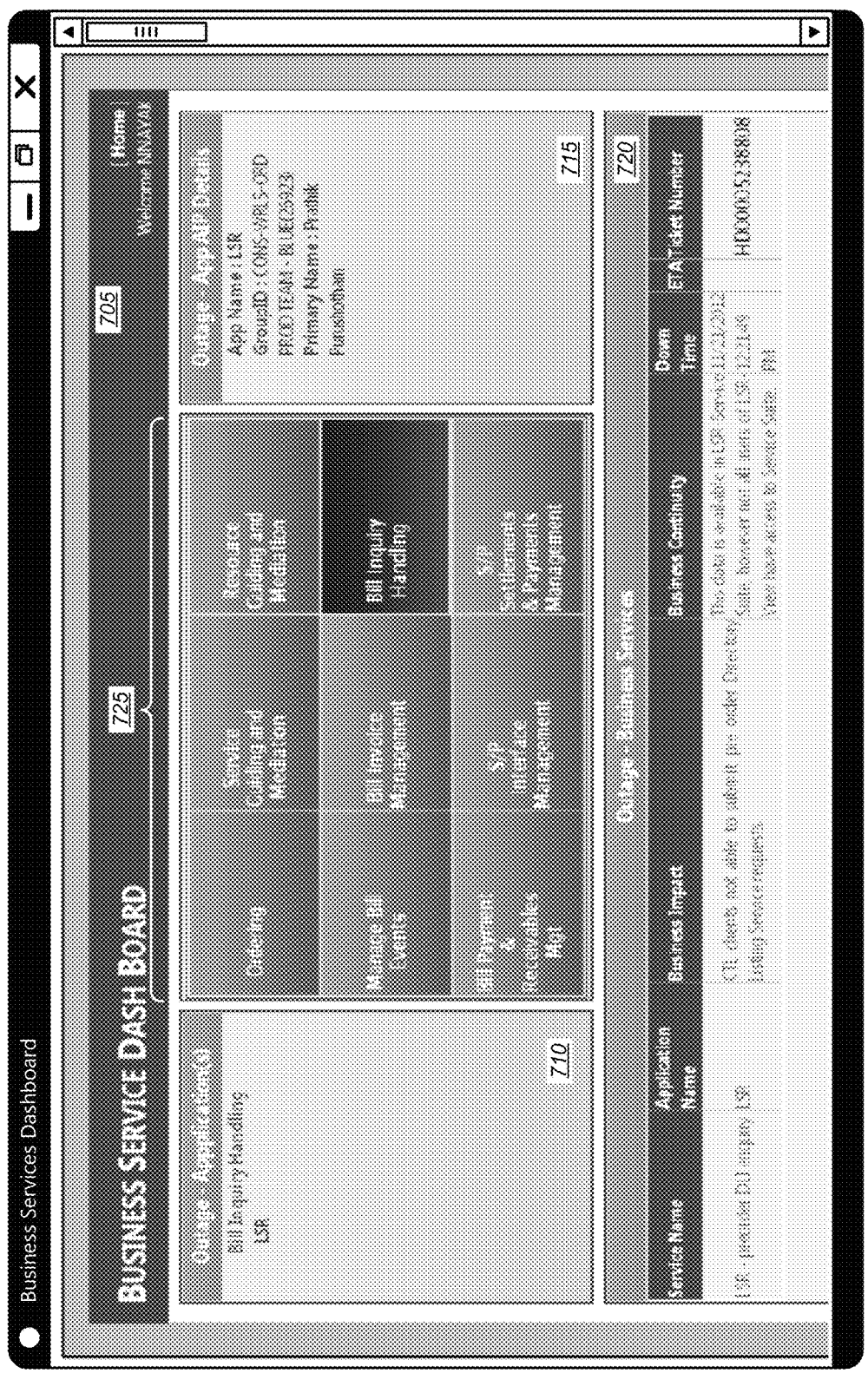
FIG. 7 is a diagram illustrating an exemplary graphical user interface for a business services dashboard, in accordance with various embodiments.

FIG. 7 is a diagram illustrating an exemplary graphical user interface ("GUI") 700 for a business services dashboard, in accordance with various embodiments. In FIG. 7, the exemplary GUI 700 might include a header 705, an applications outage section 710, an applications outage details section 715, a business services outage section 720, and an information display options section 725, or the like. The header might include the username for the user receiving the BSD and a title for the BSD (which might more specifically identify the user's BSD, or, as shown, more generically identify the BSD). The applications outage section 710 might include updates on outage events (e.g., local service requests ("LSRs"), which group might be handling the LSRs, or the like). The applications outage details section 715 might include more detailed information (e.g., group IDs, team information, primary contact information, or the like). The business services outage section 720 might include business oriented information related to the application outage (e.g., business impact information, business continuity information, downtimes, estimated times for outage resolution, ticket numbers or case numbers, etc.). The information display options section 725 might include options for the user to select different information to be displayed with respect to the applications outage. For example, the options might include information on ordering, service guidance and mediation, resource guidance and mediation, managing bill events, bill invoice management, bill inquiry handling, bill payment and receivables management, supplier/partner ("S/P") interface management, S/P settlements and payments management, or the like.

Figure 8:
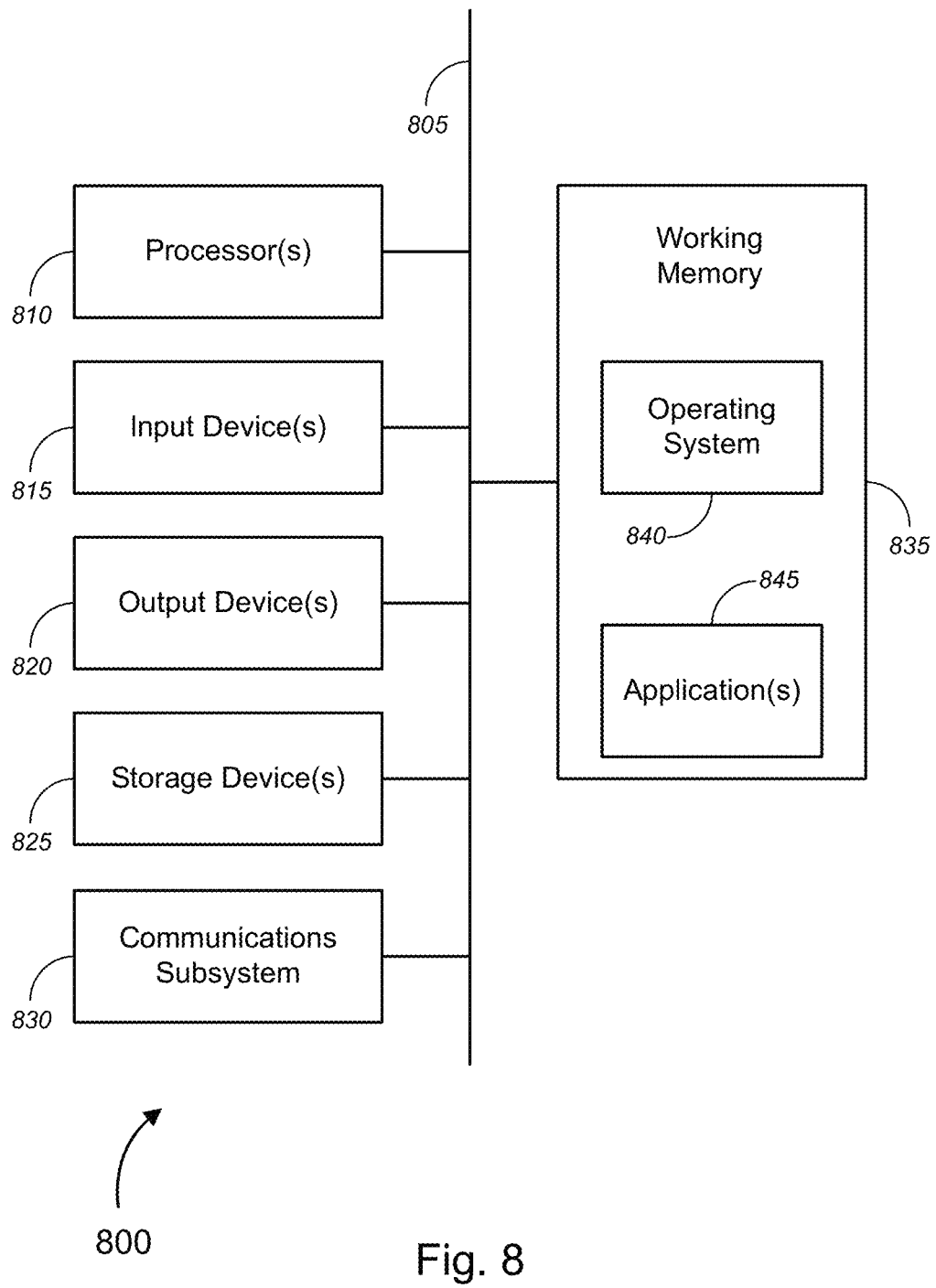
FIG. 8 is a block diagram illustrating an exemplary computer architecture, in accordance with various embodiments.

We now turn to FIG. 8, which is a block diagram illustrating an exemplary computer architecture. FIG. 8 provides a schematic illustration of one embodiment of a computer system 800 that can perform the methods provided by various other embodiments, as described herein, and/or can perform the functions of local computer system 185 or 190, or remote computer system 135, or other computer systems as described above. It should be noted that FIG. 8 is meant only to provide a generalized illustration of various components, of which one or more, or none, of each may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors, or one or more special-purpose processors such as digital signal processing chips, graphics acceleration processors, or the like; one or more input devices 815, which can include without limitation a mouse, a keyboard, or the like; and one or more output devices 820, which can include without limitation a display device, a printer, or the like.

The computer system 800 may further include, or be in communication with, one or more storage devices 825. The one or more storage devices 825 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 800 might also include a communications subsystem 830, which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 830 may permit data to be exchanged with a network (such as network 140, to name an example), with other computer systems, with any other devices described herein, or with any combination of network, systems, and devices. According to some embodiments, network 140 (as well as network 130*d*) might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 800 will further comprise a working memory 835, which can include a RAM or ROM device, as described above.

The computer system 800 may also comprise software elements, shown as being currently located within the working memory 835, including an operating system 840, device drivers, executable libraries, or other code. The software elements may include one or more application programs 845, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device, to perform one or more operations in accordance with the described methods.

A set of these instructions or code might be encoded and/or stored on a non-transitory computer readable storage medium, such as the storage devices 825 described above. In some cases, the storage medium might be incorporated within a computer system, such as the system 800. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 800, or might take the form of source or installable code. The source or installable code, upon compilation, installation, or both compilation and installation, on the computer system 800 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 800, to perform methods in accordance with various embodiments of the invention. According to a set of embodiments, some or all of the procedures of such methods might be performed by the computer system 800 in response to processor 810 executing one or more sequences of one or more instructions. The one or more instructions might be incorporated into the operating system 840 or other code that may be contained in the working memory 835, such as an application program 845. Such instructions may be read into the working memory 835 from another computer readable medium, such as one or more of the storage devices 825. Merely by way of example, execution of the sequences of instructions contained in the working memory 835 might cause the one or more processors 810 to perform one or more procedures of the methods described herein.

The terms "machine readable medium" and "computer readable medium," as used herein, refer to any medium that participates in providing data that causes a machine to operate in a specific fashion. In an embodiment implemented using the computer system 800, various computer readable media might be involved in providing instructions or code to the one or more processors 810 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 825. Volatile media includes, without limitation, dynamic memory, such as the working memory 835. Transmission media includes, without limitation, coaxial cables, copper wire and fiber optics, including the wires that comprise the bus 805, as well as the various components of the communication subsystem 830, or the media by which the communications subsystem 830 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

Figure 9:
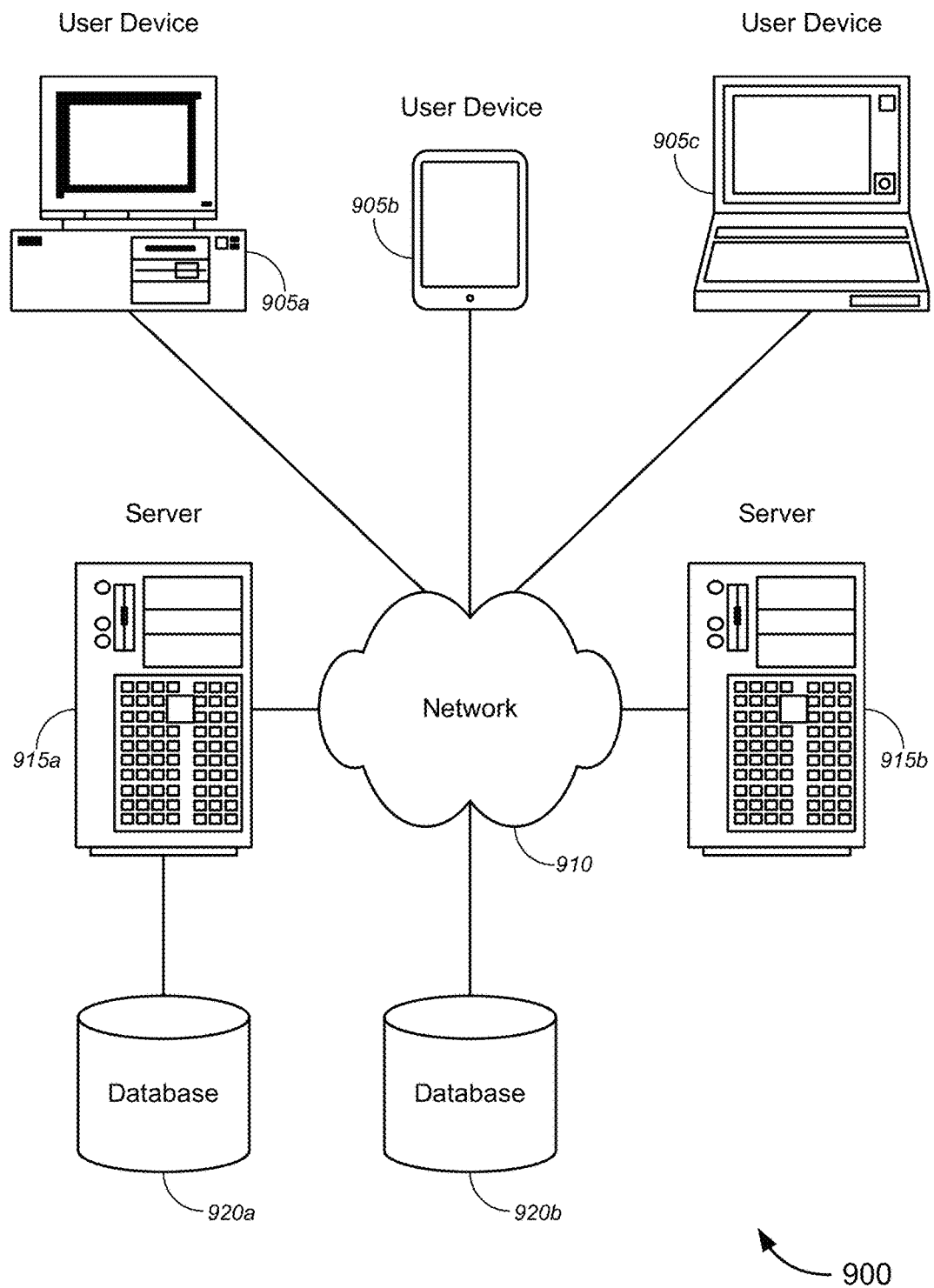
FIG. 9 is a block diagram illustrating a networked system of computers, which can be used in accordance with various embodiments.

As noted above, a set of embodiments comprises methods and systems for implementing a business services dashboard. FIG. 9 illustrates a schematic diagram of a system 900 that can be used in accordance with one set of embodiments. The system 900 can include one or more user computers or user devices 905. A user computer or user device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer or user device 905 can also have any of a variety of applications, including one or more applications configured to perform methods provided by various embodiments (as described above, for example), as well as one or more office applications, database client and/or server applications, and/or web browser applications. Alternatively, a user computer or user device 905 can be any other electronic device, such as a thin-client computer, Internet-enabled mobile telephone, and/or personal digital assistant, capable of communicating via a network (e.g., the network 910 described below) and/or of displaying and navigating web pages or other types of electronic documents. Although the exemplary system 900 is shown with three user computers or user devices 905, any number of user computers or user devices can be supported.

Certain embodiments operate in a networked environment, which can include a network 910. The network 910 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 910 can include a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP"). In another embodiment, the network might include a core network of the service provider, and/or the Internet.

Embodiments can also include one or more server computers 915. Each of the server computers 915 may be configured with an operating system, including without limitation any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer or user device 905 and/or another server 915. In some embodiments, an application server can create web pages dynamically for displaying the information in accordance with various embodiments, such as for providing a user interface for a business services dashboard, which might include a user interface for a user-specific view, a group-specific view (e.g., business user view or technology user view), and/or an end-to-end enterprise services view of the BSD, or the like. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer or user device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920. The location of the database(s) 920 is discretionary: merely by way of example, a database 920a might reside on a storage medium local to (and/or resident in) a server 915a (and/or a user computer or user device 905). Alternatively, a database 920b can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing a business services dashboard, the method comprising:
   receiving, with the computer, data associated with one or more real-time technical events corresponding to a changed condition in one or more of the at least one technology service utilizing at least one technology asset of an enterprise;
   identifying, with the computer, one or more technical issues associated with the changed condition in the at least one IT service, based at least in part on the data associated with the one or more real-time IT events;
   identifying, with the computer, a severity level for each of the one or more technical issues;
   identifying, with the computer, one or more proposed technical solutions to the one or more technical issues;
   generating, with the computer, at least one technical user view, the at least one technical user view including identification of the one or more technical issues, identification of the severity level for each of the one or more technical issues, and identification of the one or more proposed technical solutions; and
   sending, with the computer, the at least one technical user view to a first set of user devices associated with one or more first users, over a telecommunications network, for display on the first set of user devices.

2. The method of claim 1, wherein the at least one technology asset comprises at least one of one or more software applications, one or more servers, one or more databases, or one or more networks that are associated with services provided by a service provider separate from the enterprise.

3. The method of claim 1, wherein the at least one technology asset comprises at least one of one or more software applications, one or more servers, one or more databases, or one or more networks that are associated with services provided by the enterprise.

4. The method of claim 1, further comprising:
   updating, with the computer, the at least one technical user view with a second update corresponding to updates to at least one of the identification of the one or more technical issues, the identification of the severity level for each of the one or more technical issues, and the identification of the one or more proposed technical solutions;

sending, with the computer, the first update to the first set of user devices associated with the one or more first users, over the telecommunications network, for display on the first set of user devices.

5. The method of claim 1, further comprising:
defining, with a computer, one or more relationships between the at least one technology service and at least one business service provided by an enterprise, wherein the at least one technology service comprises one or more services utilizing at least one of one technology asset, wherein the at least one business service is one or more services that manage interactions between the enterprise and at least one customer, and wherein each defined relationship indicates a dependence on one or more of the at least one technology service by one or more of the at least one business service; and
identifying, with the computer and based on the one or more defined relationships between the at least one technology service and the at least one business service, one or more business events that impact the at least one business service of the enterprise, as a result of the one or more real-time technical events that correspond to the changed condition in the at least one technology asset.

6. The method of claim 5, wherein defining the one or more relationships between the at least one technology service and the at least one business service comprises defining the one or more relationships between the at least one technology service and the at least one business service using unified modeling language ("UML").

7. The method of claim 5, wherein the severity level for each of the one or more technical issues is identified based on the impact of the one or more business events on the at least one business service of the enterprise.

8. The method of claim 5, further comprising:
assigning, with the computer, user groups comprising the one or more first users and one or more second users, based on roles of the one or more first users and the one or more second users in a business process of the enterprise, wherein the one or more first users are members of at least one technical group and the one or more second users are members of at least one business group, wherein the at least one business group interacts with customers, and wherein the at least one technical group maintains at least one technology asset;
generating, with the computer, at least one business user view including identification of the one or more business events;
sending, with the computer, the at least one business user view to the second set of user devices associated with the one or more second users, over the telecommunications network, for display on the second set of user devices;
updating, with the computer, the at least one business user view with a second update corresponding to updates to the identification of the one or more business events; and
sending, with the computer, the second update to the second set of user devices associated with the one or more second users, over the telecommunications network, for display on the second set of user devices.

9. The method of claim 8, further comprising:
providing, with the computer, first options for each of the one or more first users to define or customize notification mechanisms and user interface ("UI") views of the at least one technical user view sent to the subject first user; and providing, with the computer, second options for each of the one or more second users to define or customize notification mechanisms and UI views of the at least one business user view sent to the subject second user.

10. The method of claim 8, further comprising:
providing one or more business continuity solutions to the user groups, the one or more business continuity solutions being associated with the one or more proposed technical solutions and at least partially addressing at least one of the one or more business events.

11. The method of claim 8, wherein the at least one business user view further includes one or more of identification of a measure of any service outages resulting from the changed condition in the at least one technology asset, identification of relevant service level agreements ("SLAs") associated with the at least one technology asset or the services provided by the enterprise, summary of availability of the services provided by the enterprise, or service quality of the services provided by the enterprise.

12. The method of claim 11, wherein the service quality of the services provided by the enterprise is measured and monitored by Monitoring and Alarming frameworks.

13. A system for implementing a business services dashboard, the system comprising:
a telecommunications network;
a server operatively coupled to the telecommunications network, the server comprising a processor and a non-transitory computer readable medium having stored thereon software comprising a set of instructions that, when executed by the processor, causes the server to perform one or more functions, the set of instructions comprising:
instructions to receive data associated with one or more real-time technical events corresponding to a changed condition in the one or more of the at least one technology service utilizing at least one technology asset of an enterprise;
instructions to identify one or more technical issues associated with the changed condition in the at least one IT service, based at least in part on the data associated with the one or more real-time IT events;
instructions to identify a severity level for each of the one or more technical issues;
instructions to identify one or more proposed technical solutions to the one or more technical issues;
instructions to generate at least one technical user view, the at least one technical user view including identification of the one or more technical issues, identification of the severity level for each of the one or more technical issues, and identification of the one or more proposed technical solutions; and
instructions to send the at least one technical user view to a first set of user devices associated with one or more first users, over the telecommunications network, for display on the first set of user devices.

14. The system of claim 13, wherein the at least one technology asset comprises at least one of one or more software applications, one or more servers, one or more databases, or one or more networks that are associated with services provided by a service provider separate from the enterprise.

15. The system of claim 13, wherein the at least one technology asset comprises at least one of one or more software applications, one or more servers, one or more databases, or one or more networks that are associated with services provided by the enterprise.

16. The system of claim 13, wherein the set of instructions further comprises:
  instructions to update the at least one technical user view with a second update corresponding to updates to at least one of the identification of the one or more technical issues, the identification of the severity level for each of the one or more technical issues, and the identification of the one or more proposed technical solutions; and
  instructions to send the first update to the first set of user devices associated with the one or more first users, over the telecommunications network, for display on the first set of user devices.

17. The system of claim 13, wherein the set of instructions further comprises:
  instructions to define one or more relationships between the at least one technology service and at least one business service provided by an enterprise, wherein the at least one technology service comprises one or more services utilizing at least one technology asset, wherein the at least one business service is one or more services that manage interactions between the enterprise and at least one customer, and wherein each defined relationship indicates a dependence on one or more of the at least one technology service by one or more of the at least one business service;
  instructions to identify, based on the one or more defined relationships between the at least one technology service and the at least one business service, one or more business events that impact the at least one business service of the enterprise, as a result of the one or more real-time technical events that correspond to the changed condition in the at least one technology asset.

18. The system of claim 17, wherein the instructions to define the one or more relationships between the at least one technology service and the at least one business service comprise instructions to define the one or more relationships between the at least one technology service and the at least one business service using unified modeling language ("UML").

19. The system of claim 17, wherein the severity level for each of the one or more technical issues is identified based on the impact of the one or more business events on the at least one business service of the enterprise.

20. The system of claim 17, wherein the set of instructions further comprises:
  instructions to assign user groups comprising the one or more first users and one or more second users, based on roles of the one or more first users and the one or more second users in a business process of the enterprise, wherein the one or more first users are members of at least one technical group and the one or more second users are members of at least one business group, wherein the at least one business group interacts with customers, and wherein the at least one technical group maintains at least one technology asset;
  instructions to generate at least one business user view including identification of the one or more business events;
  instructions to send the at least one business user view to a second set of user devices associated with the one or more second users, over the telecommunications network, for display on the second set of user devices;
  instructions to update the at least one business user view with a second update corresponding to the identification of the one or more business events; and
  instructions to send the second update to the second set of user devices associated with the one or more second users, over the telecommunications network, for display on the second set of user devices.

21. The system of claim 20, wherein the set of instructions further comprises:
  instructions to provide first options for each of the one or more first users to define or customize notification mechanisms and user interface ("UI") views of the at least one technical user view sent to the subject first user; and
  instructions to provide second options for each of the one or more second users to define or customize notification mechanisms and UI views of the at least one business user view sent to the subject second user.

22. The system of claim 20, wherein the set of instructions further comprises:
  instructions to provide one or more business continuity solutions to the user groups, the one or more business continuity solutions being associated with the one or more proposed technical solutions and at least partially addressing at least one of the one or more business events.

23. The system of claim 20, wherein the at least one business user view further includes one or more of identification of a measure of any service outages resulting from the changed condition in the one or more of the at least one technology service, identification of relevant service level agreements ("SLAs") associated with the at least one the one or more of the at least one technology service or the services provided by the enterprise, summary of availability of the services provided by the enterprise, or service quality of the services provided by the enterprise.

24. The system of claim 23, wherein the service quality of the services provided by the enterprise is measured and monitored by Monitoring and Alarming frameworks.

25. An apparatus for implementing a business services dashboard, the apparatus comprising:
  a processor; and
  a non-transitory computer readable medium having stored thereon software comprising a set of instructions that, when executed by the processor, causes the apparatus to perform one or more functions, the set of instructions comprising:
    instructions to receive data associated with one or more real-time technical events corresponding to a changed condition in the one or more of the at least one technology service utilizing at least one technology asset of an enterprise;
    instructions to identify one or more technical issues associated with the changed condition in the at least one IT service, based at least in part on the data associated with the one or more real-time IT events;
    instructions to identify a severity level for each of the one or more technical issues;
    instructions to identify one or more proposed technical solutions to the one or more technical issues;
    instructions to generate at least one technical user view, the at least one technical user view including identification of the one or more technical issues, identification of the severity level for each of the one or more technical issues, and identification of the one or more proposed technical solutions; and
    instructions to send the at least one technical user view to a first set of user devices associated with one or more first users, over a telecommunications network, for display on the first set of user devices.

* * * * *